(12) United States Patent
Lopez et al.

(10) Patent No.: US 11,465,549 B2
(45) Date of Patent: Oct. 11, 2022

(54) FLOATING LOAD TENSION ASSEMBLY WITH HIGH VISIBILITY

(71) Applicant: USA Products Group, Lodi, CA (US)

(72) Inventors: Manuel Lopez, Lodi, CA (US); Ryan Kosanke, Lodi, CA (US)

(73) Assignee: USA Products Group, Lodi, CA (US)

( * ) Notice: Subject to any disclaimer, the term of this patent is extended or adjusted under 35 U.S.C. 154(b) by 511 days.

(21) Appl. No.: 16/574,227

(22) Filed: Sep. 18, 2019

(65) Prior Publication Data

US 2021/0078479 A1   Mar. 18, 2021

(51) Int. Cl.
| | |
|---|---|
| *B60P 7/08* | (2006.01) |
| *B66C 1/10* | (2006.01) |
| *F16M 13/02* | (2006.01) |
| *F16G 11/14* | (2006.01) |
| *F16G 11/10* | (2006.01) |
| *B66C 1/14* | (2006.01) |

(52) U.S. Cl.
CPC .............. *B60P 7/0838* (2013.01); *B66C 1/10* (2013.01); *F16G 11/106* (2013.01); *F16G 11/143* (2013.01); *F16M 13/02* (2013.01); *B66C 1/14* (2013.01)

(58) Field of Classification Search
CPC .. Y10T 24/4755; F16G 11/143; F16G 11/106; B63B 22/22; B63B 21/20; A01M 31/06
USPC ............................................. 43/43.16–44.86
See application file for complete search history.

(56) References Cited

U.S. PATENT DOCUMENTS

| | | | | |
|---|---|---|---|---|
| 2,958,153 | A   * | 11/1960 | Yerman .................. | A01K 95/00 43/43.14 |
| 5,423,108 | A   * | 6/1995 | Brennan ............... | F16G 11/143 24/298 |
| 7,287,303 | B2 * | 10/2007 | Yang .................... | B66D 1/7415 24/265 H |
| 8,881,349 | B2 * | 11/2014 | Mulholland .......... | F16G 11/143 24/348 |
| 9,199,571 | B2 * | 12/2015 | Leung ................... | B60P 7/0823 |
| 11,118,654 | B2 * | 9/2021 | Chih ..................... | F16G 11/146 |
| 2014/0007389 | A1 * | 1/2014 | Leung .................. | F16G 11/143 24/68 CD |

* cited by examiner

*Primary Examiner* — Robert Sandy
(74) *Attorney, Agent, or Firm* — Duane Morris LLP

(57) ABSTRACT

A load tension assembly including—an enclosure formed by a first side and a second side opposite to the first side and connected to the first side at a first end and a second, wherein the Enclosure includes a primary float capability great enough to maintain floatation of the load tension assembly, is disclosed herein

8 Claims, 3 Drawing Sheets

FLOATING LOAD TENSION ASSEMBLY WITH HIGH VISIBILITY

BACKGROUND

The present disclosure relates generally to a load tension assembly, and more particularly to a load tension assembly having, among other things, high visibility and a float capability allowing for ease of visual location, identification, and retrieval when misplaced or inadvertently placed in water.

Modern load tension assemblies vary in design, but serve to secure a load for the purpose of supporting, lifting, or moving the load in an efficient and effective manner. In this regard, load tension assemblies may be employed for work related or recreational activities including professional or personal usage.

One such load tension assembly, generally known as a friction cam lock, includes a rotatable hub with a plurality of outwardly extending teeth for engagement with a spring-loaded (biased) trigger mechanism having correspondingly outwardly extending teeth. A terminal or first end of the load tension assembly is anchored to a first secure point. A second end of the load tension assembly includes a line or cord positioned secured to the load or a secure second point. A force to overcome the bias on the trigger mechanism is applied to the line positioned between the teeth of the trigger mechanism and the teeth of the hub to move the line and apply a tension to the load. As the hub rotates, the line engages the opposed teeth to prevent the hub from rotating in the opposite direction due to the tension on the line.

Load tension assemblies are well known and are used for a multitude of tasks in many different environments both indoors and outdoors where the load tension assembly might be misplaced or inadvertently dropped or placed in water. In this regard, typical load tension assemblies are primarily of a metal construction having low visibility. As such, when misplaced, the load tension assemblies are difficult to visually identify or locate, and when dropped or placed in water they sink quickly and become virtually irretrievable.

As such, it would be desirable to provide a load tension assembly having, among other things, high visibility and a float capability allowing for ease of visual location, identification, and retrieval when misplaced or inadvertently placed in water.

SUMMARY

For purposes of summarizing the disclosure, exemplary concepts have been described herein. It is to be understood that not necessarily all such concepts may be achieved in accordance with any particular embodiment. Thus, for example, those skilled in the art will recognize that embodiments may be carried out in a manner that achieves or optimizes one concept as taught herein without necessarily achieving other concepts as may be taught or suggested herein.

In one embodiment, a load tension assembly comprises an enclosure formed by a first side and a second side opposite to the first side and connected to the first side at a first end and a second end, wherein the enclosure includes a primary float capability great enough to maintain floatation of the load tension assembly.

These and other embodiments will become apparent to those skilled in the art from the following detailed description of the various embodiments having reference to the attached figures, the disclosure not being limited to any particular embodiment.

DETAILED DESCRIPTION

Figure 1:
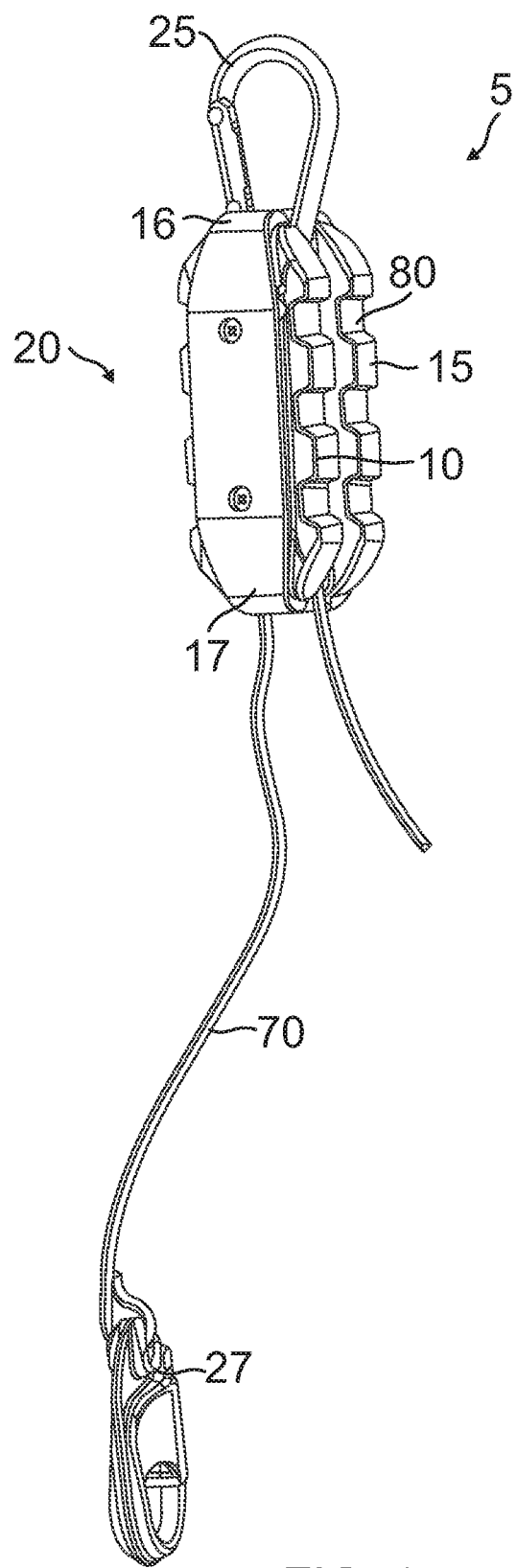
FIG. 1 shows a perspective view of a load tension assembly having high visibility and a float capability in accordance with one embodiment disclosed herein.

Exemplary embodiments will now be described with references to the accompanying figures, wherein like reference numbers refer to like elements throughout. The terminology used in the description presented herein is not intended to be interpreted in any limited or restrictive manner simply because it is being utilized in conjunction with a detailed description of certain embodiments. Furthermore, various embodiments (whether or not specifically described herein) may include novel features, no single one of which is solely responsible for its desirable attributes or which is essential to practicing any of the embodiments herein described.

The present disclosure relates generally to a load tension assembly, and more particularly to a load tension assembly having, among other things, high visibility and a float capability allowing for ease of visual location, identification, and retrieval when misplaced or inadvertently placed in water.

As used herein, the term "hub" is intended to include a spindle, a spool, a sheave, or a similar type article(s) that is configured or may be adapted to permit rotation of the hub to facilitate tensioning of a "line" used for the purpose of applying tension to secure a "load".

As used herein, the term "line" is intended to include a rope (round synthetic, natural fiber, metal), a cable, a cord, a flat line (webbing), an anchor line or tensioning line, or a similar type of article(s) that may be adapted to be used with the load tension assembly disclosed herein for the purpose of applying tension, herein referred to as a "load tension", to secure a "load".

As used herein, the term "load" or cargo is intended to include any item or object that are generally secured to prevent movement of the item(s) while in a static position, or while being moved or transported from one position to another position.

The load tension assembly described herein provides, among other things, high visibility and a float capability allowing for ease of visual location, identification, and retrieval when misplaced or inadvertently placed in water.

Various parts, elements, components, etc., of the load tension assembly disclosed herein may be constructed from metal, plastic, composite, or other suitable material or combination thereof for providing a rigid and sturdy structure with high visibility and float capability to facilitate tensioning of a line for the purpose of securing, supporting, lifting, or moving a load.

The actual size and dimension of any and all of the various parts, elements, components, etc., of the load tension assembly may vary depending on various factors including, among other things, intending application or usage of the assembly, as well as the size of the load to be secured or prevented from moving while in a static position, or while being moved or transported from one position to another position.

Connection(s) between the various parts, elements, components, etc., of the load tension assembly may be accomplished using a variety of methods or processes. As such, the connections, whether integral and created via bending, or form molding, for example, or connected via bonding, hardware (nuts, bolts, washers, etc.), welding, or similar techniques, are well known in the art and omitted for simplicity.

Figure 2:
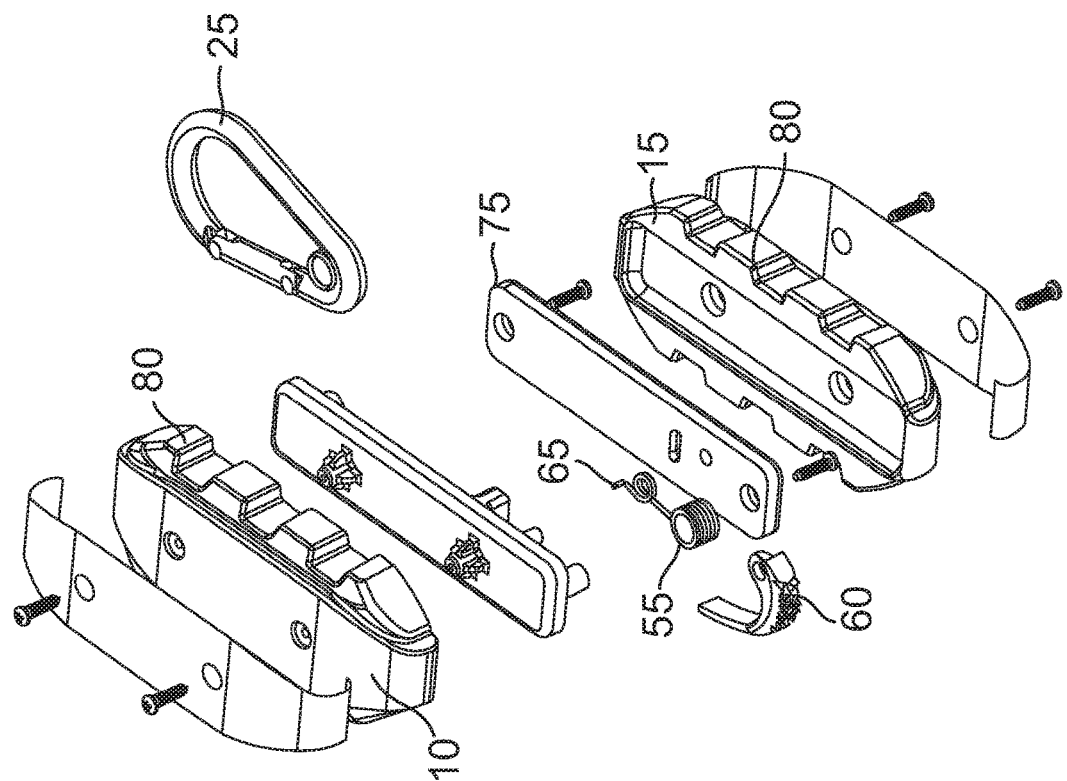
FIG. 2 shows an exploded view of the load tension assembly having high visibility and a float capability in accordance with one embodiment disclosed herein.
Figure 2:
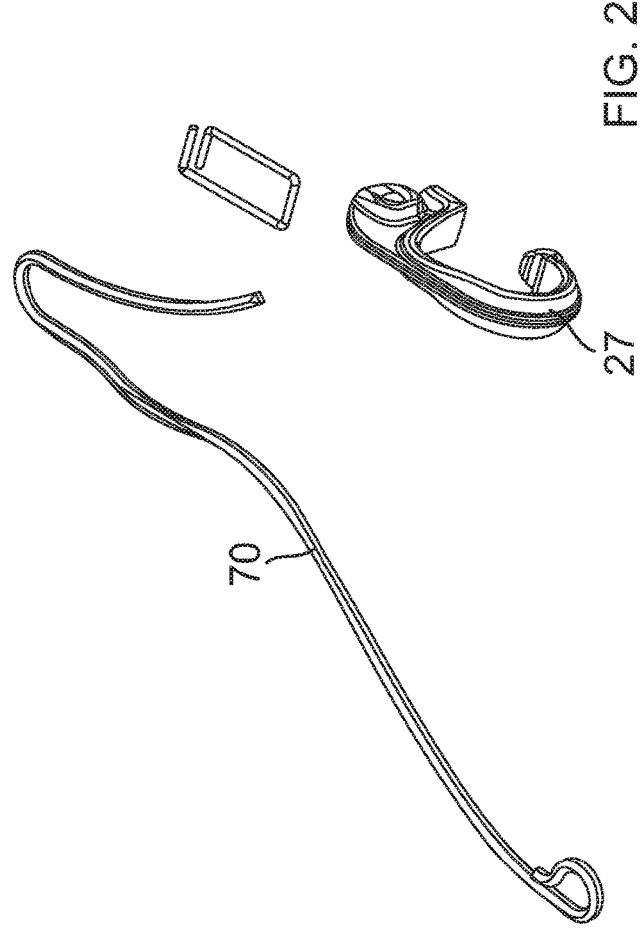
Figure 3A:
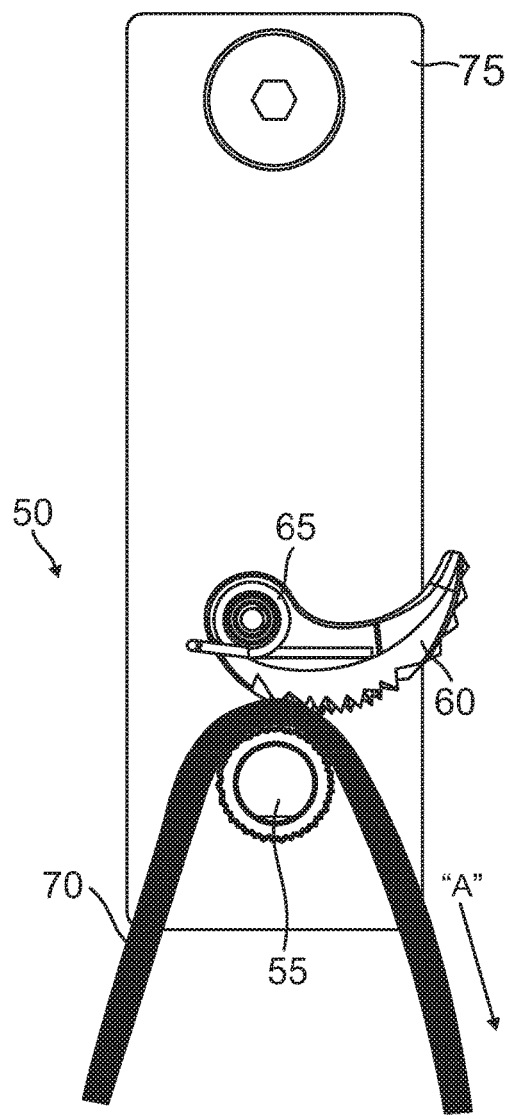
FIG. 3A shows a cut-away view of a load tension assembly with a trigger mechanism in a secure position in accordance with one embodiment disclosed herein.
Figure 3B:
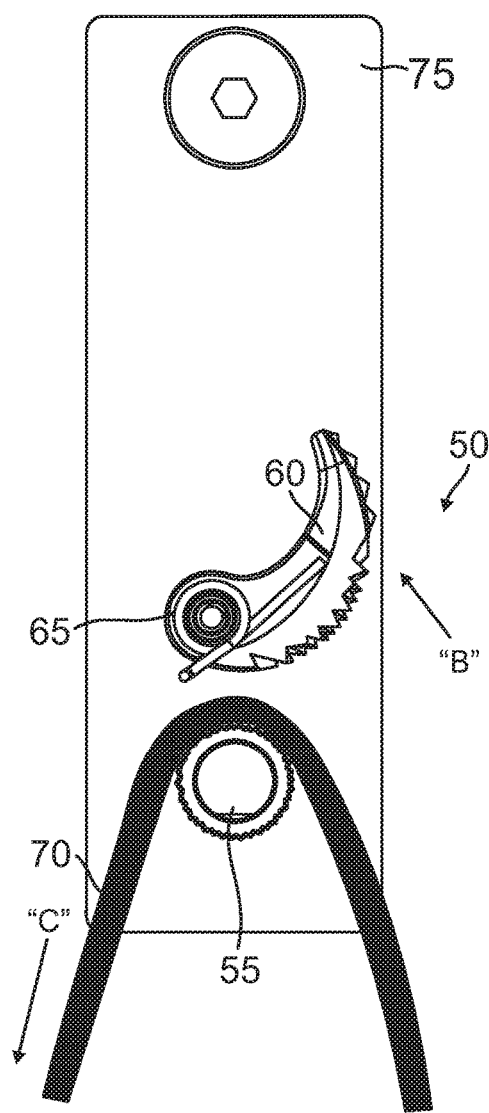
FIG. 3B shows a cut-away view of the load tension assembly with a trigger mechanism in a release position in accordance with one embodiment disclosed herein.

The load tension assembly is constructed of a sturdy, high visibility, float capability material allowing for ease of visual location, identification, and retrieval when misplaced or inadvertently placed in water while providing for securing, supporting, lifting, or moving a load in an efficient and effective manner. FIG. 1 shows a perspective view of a load tension assembly including an enclosure having high visibility and a float capability in accordance with one embodiment disclosed herein. The enclosure provides a sturdy structure to protect components or elements disposed therebetween from damage and contaminants, as well as for providing compact and convenient storage of the load tension assembly. FIG. 2 shows an exploded view of the load tension assembly having high visibility and a float capability in accordance with one embodiment disclosed herein. FIGS. 3A and 3B show operational characteristics of a friction cam lock device in accordance with one embodiment disclosed herein.

The load tension assembly 5 includes a first side 10 and a second side 15 that form an enclosure 20 where components of the load tension assembly 5 are disposed between the first side 10 and the second side 15. The first side 10 is positioned opposite to the second side 15. As shown in FIG. 1, the first side 10 and the second side 15 have a common first end 16 and a common second end 17 that is opposite to the first end 16. The first side 10 and second side 15 of the enclosure 20 may include a contoured surface 80 such as a knurled, ribbed, or grooved surface to assist in gripping the load tension assembly 5 during use or transport. The contoured surface 80 is positioned along the exterior edges of the first side 10 and second side 15 and are configured or shaped to assist in manipulating the load tension assembly 5 and to facilitate convenient and secure storage of a line 70 that may be wrapped or wound around the enclosure 20. In this regard, as the line 70 is wrapped around the enclosure 20, grooves or ribs formed in the contoured surface 80 hold the line 70 securely in place.

The first end 16 includes a first attachment device 25 extending from the enclosure 20 that may be shaped as a hook, claw, hoop, or similar feature and attached or connected to a fixed point to act as an anchor to secure the load tension assembly 5 and facilitate the application of a load tension. The first attachment device 25 may be rotatable about a first axis from the extended position outside the enclosure 20 inward or toward the enclosure 20 to the retracted position where the first attachment device 25 is disposed within the enclosure 20.

As shown in FIG. 2, the second end 17 includes a line 70 and a second attachment device 27. In addition, the second end 17 includes components or elements for applying a load tension that are disposed between the first side 10 and second side 15. In this regard, a rotatable hub 55, a trigger mechanism 60, and a tension spring 65 are positioned at the second end 17 and disposed between the first side 10 and second side 15 to facilitate securing, supporting, lifting, or moving a load in an efficient and effective manner. In one embodiment the rotatable hub 55, trigger mechanism 60, and tension spring 65 may constitute a friction cam lock 50.

The rotatable hub 55, trigger mechanism 60, and tension spring 65 each include an orifice for accepting various hardware elements such as a screw, nut, spacer, washer, pin, etc., which permit the rotatable hub 55, trigger mechanism 60, and tension spring 65 to rotate at the second end 17 of the enclosure 20. In this regard, the hub 55 is rotatable about a second axis at the second end 17 of the enclosure and may include a knurled surface, for example outwardly extending teeth. The tension spring 65 biases the trigger mechanism 60 toward the rotatable hub 55. The trigger mechanism 60 and the rotatable hub 55 may each include a plurality of corresponding outwardly extending teeth for engagement with a line 70.

The trigger mechanism 60 may be rotated back and forth from a secure position to a release position, as shown in FIGS. 3A and 3B. As shown in FIG. 3A, in the secure position the tension spring 65 biases the trigger mechanism 60 toward the rotatable hub 55 to secure the line 70 from moving when a load tension is applied to a load attached to one end of the line 70. As a force is applied to the line 70 in the direction shown by arrow "A" the tension of the tension spring 65 on the trigger mechanism 60 is overcome and the line 70 is moved between the trigger mechanism 60 and the rotatable hub 55 to move a load. When the force in direction "A" is removed, the line 70 is retained between the trigger mechanism 60 and the rotatable hub 55. In the secure position the trigger mechanism 60 partially extends from the enclosure 20 to provide an exposed surface for the application of a force. As shown in FIG. 3B, as a force is applied to the trigger mechanism 60 in the direction shown by arrow "B" the trigger mechanism 60 is moved away from contact with the line 70 to the release position. In this regard when the trigger mechanism 60 is moved from the secure position to the release position, the load tension on the line 70 due to the load moves the line 70 in the direction shown by arrow "C".

A method of the load tension assembly 5 includes anchoring or attaching the first attachment device 25 positioned at the terminal or first end of the load tension assembly 5 to a first point. Positioning a line 70 such as a flat webbing, rope, chord, etc., between the trigger mechanism 60 and the rotatable hub 55. Attaching the second attachment device 27 to a load or second point. Applying a force to the line 70 to move the line 70 between the trigger mechanism 60 and the rotatable hub 55, and allowing the rotatable hub 55 to rotate. As the hub 55 rotates, a load tension is applied to the line 70 and the load is secured or moved. The trigger mechanism 60 is biased in the secure position to prevent rotation of the hub 55, and movement of the line 70 in the direction of the load. When biased in the secure position the trigger mechanism 60 engages the line 70 and forces the strap against the rotatable hub 55 to maintain the load tension and prevent movement of the load. When the trigger mechanism 60 is moved away from the line 70 and placed in the release position the load tension placed on the line 70 from the load moves the line 70 in the direction of the load. As such, the load tension assembly facilitates securing, supporting, lifting, or moving a load in an efficient and effective manner.

Load tension assemblies are well known and are used for a variety of tasks in diverse environments both indoors and outdoors where the load tension assembly might be misplaced or inadvertently dropped or placed in water. The metal construction of known load tension assemblies imparts substantial weight to the load tension assembly while giving the load tension assembly a matte, flat, or plain outward appearance or finish. As a result, when misplaced, known load tension assemblies are difficult to visually identify or locate, and when dropped or placed in water they lack buoyancy, sink quickly, and become virtually irretrievable.

The load tension assembly 5 disclosed herein, addresses the problems of known load tension assemblies by providing a load tension assembly 5 having, among other things, high visibility and a float capability allowing for ease of visual location, identification and retrieval when misplaced or inadvertently placed in water. In this regard, the first side 15 and second side 17 forming the enclosure 20 of the load tension assembly 5 are each constructed of closed cell polyurethane to provide primary float capability or buoyancy to the load tension assembly 5. In this regard, the primary float capability of the enclosure 20 is great enough to maintain floatation of the entire load tension assembly. In other words, the load tension device is buoyant as the enclosure enables the entire load tension assembly 5 to float allowing the load tension assembly 5 to be easily retrieved if inadvertently introduced to water.

The enclosure 20 forms a housing or body wherein components (attachment devices 25, 27, rotatable hub 55, trigger mechanism 60, and tension spring 65) for applying a load tension are disposed. The enclosure 20 includes a contoured surface 80 configured to assist in manipulating the load tension assembly 5 and for convenient storage of the line 70. As such, the enclosure 5 is a critical element in both structure and function of the load tension assembly 5.

The load tension assembly 5 may be manufactured using an appropriate additive manufacturing process such as 3-D printing to integrally form and quickly, efficient, and precisely produce the first side 10 and second side 15 of the enclosure 5. The use of closed cell polyurethane or a similar type of plastic to impart float or buoyant capability to the load tension device 5 allows for the use of a high visibility color in the float capable material during the 3-D manufacturing process. In this regard, dyes, coloring, or other substances may be added to the float capable material to provide one or more of a high visibility color, or a light reflective property, or a glow in the dark characteristic, or neon colors to further enhance visibility.

The first attachment device 25 and the second attachment device 27 each may be constructed of polypropylene, and other frame members such as a mounting board 75 for attaching the rotatable hub 55, trigger mechanism 60, and tension spring 65 may be constructed of Delrin® or a similar type plastic to provide secondary float capability to the load tension assembly 5. Similar to the enclosure 20, visual enhancement of the attachment devices 25, 27 may be achieved through the use of color, dyes, coloring, or other substances added during material construction.

Although the method(s)/step(s) are illustrated and described herein as occurring in a certain order, the specific order, or any combination or interpretation of the order, is not required. Obvious modifications will make themselves apparent to those skilled in the art, all of which will not depart from the essence of the disclosed subject matter, and all such changes and modifications are intended to be encompassed within the appended claims.

What is claimed is:

1. A load tension assembly comprising:
   an enclosure formed by a first side and a second side opposite to the first side and connected to the first side at a first end and a second end;
   wherein the enclosure includes a primary float capability great enough to maintain floatation of the load tension assembly; and
   wherein the load tension assembly is a friction cam lock and the enclosure forms a housing where components of the friction cam lock for applying a load tension are disposed.

2. The load tension assembly of claim 1, wherein the friction cam lock includes a rotatable hub, a trigger mechanism, and a tension spring.

3. The load tension assembly of claim 1, wherein the enclosure is constructed of closed cell polyurethane.

4. The load tension assembly of claim 3, wherein the enclosure is one of a high visibility color, or a light reflective property, or a glow in the dark characteristic.

5. The load tension assembly of claim 3, wherein the first side and the second side of the enclosure includes a contoured surface to facilitate secure storage of a line wrapped around the enclosure.

6. The load tension assembly of claim 3, wherein a first attachment device is attached to the first end of the enclosure and a second attachment device is connected to a line and disposed at the second end, and the first attachment device and the second attachment device are each constructed of polypropylene.

7. A load tension assembly comprising:
   an enclosure formed by a first side and a second side opposite to the first side and connected to the first side at a first end and a second end;
   wherein the enclosure includes a primary float capability great enough to maintain floatation of the load tension assembly;
   wherein the load tension assembly is a friction cam lock and the enclosure forms a housing where the components of the friction cam lock for applying a load tension are disposed, and
   wherein the first side and second side of the enclosure includes a contoured surface to facilitate secure storage of a line wrapped around the enclosure.

8. A load tension assembly comprising:
   an enclosure formed by a first side and a second side opposite to the first side and connected to the first side at a first end and a second end;
   wherein the enclosure includes a primary float capability great enough to maintain floatation of the load tension assembly;
   wherein the load tension assembly is a friction cam lock and the enclosure forms a housing where components of the friction cam lock for applying a load tension are disposed, and
   wherein the enclosure is one of a high visibility color, or a light reflective property, or a glow in the dark characteristic.

* * * * *